(12) United States Patent
Handelman

(10) Patent No.: US 6,634,028 B2
(45) Date of Patent: Oct. 14, 2003

(54) TELEVISION SYSTEM COMMUNICATING INDIVIDUALLY ADDRESSED INFORMATION

(75) Inventor: Doron Handelman, Givataim (IL)

(73) Assignee: News Datacom, Ltd., London (GB)

( * ) Notice: Subject to any disclaimer, the term of this patent is extended or adjusted under 35 U.S.C. 154(b) by 55 days.

(21) Appl. No.: 08/988,826

(22) Filed: Dec. 11, 1997

(65) Prior Publication Data

US 2002/0073435 A1 Jun. 13, 2002

Related U.S. Application Data

(63) Continuation of application No. 08/393,443, filed on Feb. 23, 1995, now Pat. No. 5,715,315, which is a continuation of application No. 08/121,349, filed on Sep. 15, 1993, now Pat. No. 5,414,773.

(30) Foreign Application Priority Data

Aug. 19, 1993 (IL) ................................. 106746

(51) Int. Cl.$^7$ ..................... H04N 7/10; H04N 7/173; H04L 12/56; H04M 11/06

(52) U.S. Cl. .................. 725/116; 725/106; 725/137; 725/140; 725/141; 348/473; 348/468; 348/552

(58) Field of Search ............. 348/7, 6, 12, 10, 348/552, 460–487, 563–564, 906; 725/32–36, 135–153, 39–61, 109–116

(56) References Cited

U.S. PATENT DOCUMENTS

| | | |
|---|---|---|
| 3,594,495 A | 7/1971 | Bond |
| 3,678,180 A | 7/1972 | Bond |
| 3,868,640 A | 2/1975 | Binnie et al. |
| 3,922,492 A | 11/1975 | Lumsden |
| 4,207,598 A | 6/1980 | Reich et al. |
| 4,264,924 A | 4/1981 | Freeman |
| 4,264,925 A | 4/1981 | Freeman et al. |
| 4,361,730 A | 11/1982 | Barber et al. |
| 4,450,477 A | 5/1984 | Lovett |
| 4,509,073 A * | 4/1985 | Baran et al. ............... 348/12 |
| 4,533,948 A | 8/1985 | McNamara et al. |
| 4,535,356 A * | 8/1985 | Nakagawa et al. ......... 348/482 |
| 4,567,512 A * | 1/1986 | Abraham .................. 348/7 |
| 4,574,305 A * | 3/1986 | Campbell et al. .......... 725/119 |
| 4,616,263 A | 10/1986 | Eichelberger |
| 4,694,490 A * | 9/1987 | Harvey et al. ............. 380/20 |
| 4,757,497 A | 7/1988 | Beierle et al. |

(List continued on next page.)

FOREIGN PATENT DOCUMENTS

WO    WO 87/04884    8/1987

OTHER PUBLICATIONS

Metin B. Akgun, "Comparison of Technology and Capital Costs for New Home Services", IEEE Transactions on Cable Television, vol. CATV–5, No. 3, Jul. 1980, pp. 124–138.

Bottack, H.D.; Engler, E.; Klahn, D.; Felske, D., Neusltrelitz, "Verteilung AMI/CPFSK–modulierter Datan Uber einen analogen Satelliten–Standard–TV–Kanal".

Bettack, H.D., E. Engler, D. Klahn, D. Felske: Neustrelitz "Distribution of AMI/CPFSK–modulated data across an analog satellite standard TV channel" Article Clipping from "Nachrichtentechnik Elektronik", 40 (1990), No. 4, Berline.

(List continued on next page.)

Primary Examiner—Andrew Faile
Assistant Examiner—Reuben Brown
(74) Attorney, Agent, or Firm—Oppenheimer Wolff & Donnelly, LLP

(57) ABSTRACT

A CATV system including a CATV network, a multiplicity of subscriber units, apparatus for transmitting over said CATV network encrypted information individually addressed to a subscriber unit and apparatus associated with each of said multiplicity of subscriber units for decoding the encrypted information addressed thereto.

15 Claims, 9 Drawing Sheets

U.S. PATENT DOCUMENTS

| | | | |
|---|---|---|---|
| 4,787,085 A | | 11/1988 | Suto et al. |
| 4,894,789 A | | 1/1990 | Yee |
| 4,901,367 A | | 2/1990 | Nicholson |
| 4,908,859 A | | 3/1990 | Bennett et al. ............... 380/10 |
| 4,941,040 A | * | 7/1990 | Pocock et al. ................. 348/7 |
| 4,991,011 A | * | 2/1991 | Johnson et al. ............. 348/589 |
| 5,003,591 A | * | 3/1991 | Kauffman et al. ............. 348/7 |
| 5,010,499 A | | 4/1991 | Yee |
| 5,027,400 A | | 6/1991 | Baji et al. |
| 5,027,426 A | | 6/1991 | Chiocca, Jr. |
| 5,060,257 A | | 10/1991 | Penalver |
| 5,073,931 A | | 12/1991 | Audebert et al. |
| 5,077,607 A | | 12/1991 | Johnson et al. |
| 5,089,885 A | | 2/1992 | Clark |
| 5,093,718 A | | 3/1992 | Hoarty et al. |
| 5,109,414 A | | 4/1992 | Harvey et al. |
| 5,130,792 A | | 7/1992 | Tindell et al. |
| 5,155,591 A | * | 10/1992 | Wachob ......................... 348/9 |
| 5,191,410 A | | 3/1993 | McCalley et al. |
| 5,260,778 A | * | 11/1993 | Kauffman et al. ............ 725/33 |
| 5,278,889 A | | 1/1994 | Papanicolaou et al. |
| 5,309,432 A | * | 5/1994 | Kanakia ..................... 370/412 |
| 5,317,391 A | * | 5/1994 | Banker et al. .............. 725/139 |
| 5,329,308 A | | 7/1994 | Binns et al. |
| 5,343,240 A | | 8/1994 | Yu |
| 5,365,264 A | | 11/1994 | Inoue et al. |
| 5,374,951 A | | 12/1994 | Welsh |
| 5,379,421 A | | 1/1995 | Palazzi, III et al. |
| 5,414,756 A | * | 5/1995 | Levine ......................... 379/67 |
| 5,414,773 A | | 5/1995 | Handelman |
| 5,421,030 A | | 5/1995 | Baran |
| 5,440,335 A | | 8/1995 | Beveridge |
| 5,473,673 A | * | 12/1995 | Wijk et al. ..................... 379/92 |
| 5,488,413 A | | 1/1996 | Elder et al. |
| 5,497,187 A | * | 3/1996 | Banker et al. .............. 725/144 |
| 5,504,519 A | | 4/1996 | Remillard |
| 5,561,709 A | * | 10/1996 | Remillard ................... 348/552 |
| 5,583,560 A | | 12/1996 | Florin et al. |
| 5,621,456 A | * | 4/1997 | Florin et al. ................... 348/7 |
| 5,790,174 A | * | 8/1998 | Richard et al. ................. 348/7 |
| 5,812,534 A | * | 9/1998 | Davis et al. ................ 370/260 |

OTHER PUBLICATIONS

Tanaka, Kiyoshi; Nakamura, Yasuhiro; and Matsui, Kineo "Multiplexing Documents on Facsimile Broadcasting" Paper—Electronics, Information and Comm. Engineers, E74(1991) Sep. No. 9, Tokyo, JP.

Technology 1993, Telecommunications, 9918–9235/93/ Copyright 1993 IEEE Spectrum Jan. 1993.

Kaza, Andrew L., "Cable/telephony possibilities" Mar. 1993, International Cable.

Wittering, Stewart, "Cable telecom UK" Mar. 1993, International Cable.

Willard, David G., "A Time Division Multiple Access System for Digital Communication" The MITRE Corporation, Bedford, Massachusetts, Computer Design, Jun. 1974.

Smith, Ernest K., Fellow, "Pilot TwoWay CATV Systems" IEEE Transactions on Communications, vol. COM–23, No. 1, Jan. 1975.

Clouston, Brendan R., "Laws of Convergence: Impacting cable's future", International Cable, Mar. 1993.

Baran, Paul, "Broad–Band Interactive Communication Services to the Home: Part 1–Potential Market Demand" IEEE Transactions on Communications, vol. Com–23, No. 1, Jan. 1975.

EXAR Preliminary XR–T7288.

Wright, James B.; Block, Martin P.; McVoy, D. Stevens, "An Evolutionary Approach to the Development of Two–Way Cable Technology Communication" IEEE Transactions on Cable Televesion, vol. CATV–2, No. 1, Jan. 1977.

Hare, A.G. and Ithell, A.H., "Multipurpose Wide–Band Local–Distribution—Proposals for an Integrated System" IEE Transactions on Communications, vol. Com 23, No. 1, Jan. 1975.

Coyne, John J., "An Integrated Board–Band Distribution System Using Demand Assignment", IEEE Transactions on Communications, vol. Com–23, No. 1, Jan. 1975.

Becker, Dietrich and Willibald, Gunter E., Classification and Assessment of Telecommunication Services in Broad–Band Networks, IEEE Transactions on Communications, vol. Com–23, No. 1, Jan. 1975.

Bordewijk, Jan L., "On the Marriage of Telephone and Television" IEEE Transactions on Communications, vol. 23, No. 1, Jan. 1975.

Potter, Robert J., "Electronic Mail", Science vol. 195.

Sato, Hiroshi, "Two–User Communication Channels", IEEE Transactions on Information Theory, vol. IT–23, No. 3, May 1977.

Millar, Jeffrey R.; Gutmann, Ronald J.; and Rose, Kenneth, "Methods for Supplying Interactive Services on Broad–Band Communication Networks", IEEE Transactions on Communications, vol. COM–23, No. 1, Jan. 1975.

Baran, Paul, "Broad–Band Interactive Communication Services to the Home, Part II—Impasse", IEEE Transactions on Communications, vol. COM–23, No. 1, Jan. 1975.

Maeda, Koji, "Individualized Still–Picture Communication on a Two–Way Broad–Band CATV System", IEEE Transactions on Communications, vol. COM–23, No. 1, Jan. 1975.

* cited by examiner

TELEVISION SYSTEM COMMUNICATING INDIVIDUALLY ADDRESSED INFORMATION

This is a continuation application of application Ser. No. 08/393,443, filed Feb. 23, 1995, now U.S. Pat. No. 5,715,315 which is in turn a continuation of application Ser. No. 08/121,349, filed Sep. 15, 1993, now U.S. Pat. No. 5,414,773.

FIELD OF THE INVENTION

The present invention relates to CATV systems generally and more particularly to CATV systems which provide additional services to subscribers.

BACKGROUND OF THE INVENTION

Existing CATV systems employ radio-frequency (RF) links, such as cable and satellite links, or optical links using fiber-optic cables for transmission of TV program material. CATV systems which provide transmissions only from a headend to a plurality of subscribers are called one-way systems. CATV systems which additionally involve transmissions from subscribers' units are called two-way systems.

Some of the one-way systems also employ a telephone link for transmission of management data to the subscribers, while others transmit the management data via the RF or optical links.

Current two-way CATV systems transmit TV and audio programs via cable or satellite and receive data from subscriber units via telephone links. Such systems are hereinafter termed "combination telephone-radio frequency CATV" systems. The data received is mainly CATV subscriber viewing data, subscriber program ratings and the like.

In order to enable telephonic communications, the available CATV converters incorporate modem units which are directly coupled to existing telephone links.

Descriptions of prior art telephonic transponders which are also suitable for CATV systems may be found in several patents. For example, U.S. Pat. No. 3,922,492 to Lumsden describes a remote meter reading transponder which includes a modem. U.S. Pat. No. 3,868,640 to Binnie et al. describes a system for interrogating remote stations via an automatic dialer.

Neither the existing one-way CATV systems nor the two-way systems available today are used to provide services to subscribers. Although existing two-way systems employ telephonic modems, they are mainly used for communication management and for subscriber viewing data readout. Today, telephonic communication via a modem is mostly done at low data rates and for short periods over long intervals, thus leaving the telephonic modems unexploited for long periods.

In an article named "An Evolutionary Approach to the Development of Two-Way Cable Technology Communication" by J. B. Wright, M. P. Block and D. S. McVoy in IEEE Transactions on Cable Television, Vol. CATV-2, No. 1, January 1977, mention is made of proposed two-way CATV systems in which electronic automated newspaper, second class mail and on demand catalogs will be distributed to subscribers.

SUMMARY OF THE INVENTION

The present invention seeks to provide CATV systems having significant additional applications such as facsimile, electronic-mail (E-mail), voice-mail and mail. The term "CATV" is used throughout the specification and claims in an unusually broad sense to include cable television networks as well as satellite television and pay television generally. The term "mail" is used throughout the specification and claims in a broad sense to include any written or printed material such as the type which is usually delivered to households such as bills, credit card statements, advertising, messages from institutions etc. The term "mail" does not include CATV programming billing data and messages related to programming from CATV operators.

For the purposes of the present invention, the term "encrypt" in all of its forms will be used in a broader than usual sense to cover all forms of data encoding, ranging from simple scrambling or encoding to hard encryption.

There is thus provided in accordance with a preferred embodiment of the present invention a CATV system including:

a CATV network;

a multiplicity of subscriber units;

apparatus for transmitting over the CATV network encrypted information individually addressed to a subscriber unit; and apparatus associated with each of the multiplicity of subscriber units for decoding the encrypted information addressed thereto.

Additionally in accordance with a preferred embodiment of the present invention there is provided a CATV system including:

a CATV network;

a multiplicity of subscriber units;

apparatus for transmitting facsimile information over the CATV network; and a facsimile unit associated with at least one of the multiplicity of subscriber units for receiving facsimile information over the CATV network.

Further in accordance with a preferred embodiment of the present invention there is provided a CATV system including:

a CATV network;

a multiplicity of subscriber units;

apparatus for transmitting information over the CATV network; and a hard copy output unit for providing a hard copy output of information received via the CATV network.

Still further in accordance with a preferred embodiment of the present invention there is provided a CATV system including:

a CATV network;

a multiplicity of subscriber units;

apparatus for transmitting mail over the CATV network addressed to at least one subscriber unit; and apparatus associated with each of the multiplicity of subscriber units for receiving the mail addressed thereto.

Preferably each of the multiplicity of subscriber units includes a television and a CATV converter.

In accordance with a preferred embodiment of the present invention the CATV converter has associated therewith the apparatus for decoding the coded information addressed thereto.

Preferably the encrypted information includes scrambled information, which may be, for example, facsimile information, E-mail information, voice-mail information and mail.

It is appreciated that the features of the various embodiments described above may be combined in any suitable useful combination.

Preferably, the CATV system further includes:

a keyboard for entering information to be transmitted via a telephone link;

a processor for preparing the information in a format suitable for transmission over the telephone link; and a unit for transmitting over the telephone link at least one of mail, facsimile, electronic-mail and voice-mail information.

Additionally in accordance with a preferred embodiment of the present invention, the CATV system further includes a memory unit for storing at least one of mail, facsimile, electronic-mail and voice-mail information.

In accordance with a preferred embodiment of the invention, the CATV system additionally includes at each subscriber unit a processor for receiving the information in a format suitable for transmission over the telephone link and converting the information to a form which is suitable for output to a user.

Preferably, the processor includes a converter for converting the information to a form suitable for display on a television receiver. Additionally or alternatively, the processor includes a converter for converting the information to a form suitable for hard copy output.

Preferably, the processor includes a memory for storing information received via the telephone link.

Additionally in accordance with a preferred embodiment of the invention, there is provided a CATV transmission method for use with a CATV network and a multiplicity of subscriber units including the steps of:

transmitting over the CATV network encrypted information individually addressed to at least one subscriber unit; and at each of the multiplicity of subscriber units decoding the encrypted information addressed thereto.

Preferably the method also includes the step of decoding the encrypted information addressed to the subscriber unit.

Preferably the encrypted information includes scrambled information, which may be, for example, facsimile information, E-mail information, voice-mail information and mail.

Additionally in accordance with a preferred embodiment of the present invention there is provided a CATV transmission method for use with a CATV network and a multiplicity of subscriber units including:

transmitting facsimile information over the CATV network; and receiving facsimile information over the CATV network at at least one of the multiplicity of subscriber units.

Further in accordance with a preferred embodiment of the present invention there is provided a CATV transmission method for use with a CATV network and a multiplicity of subscriber units including:

transmitting information over the CATV network; and providing a hard copy output of information received via the CATV network.

Still further in accordance with a preferred embodiment of the present invention there is provided a CATV method for use with a CATV network and a multiplicity of subscriber units including:

transmitting mail over the CATV network addressed to at least one subscriber unit; and at each of the multiplicity of subscriber units receiving the mail addressed thereto.

It is appreciated that the features of the various methods described above may be combined in any suitable useful combination.

In accordance with a preferred embodiment of the present invention, the CATV network is a combination telephone-radio frequency CATV network.

Preferably, the CATV network is a two-way CATV network.

In accordance with a preferred embodiment of the present invention, the information is received via a telephone link. Preferably, the telephone link is the telephone link of the CATV network.

Preferably, the above methods also include the step of storing received information.

Preferably each subscriber unit receives the information in a format suitable for transmission over the telephone link and converts the information to a form which is suitable for output to a user.

In accordance with one embodiment of the present invention, each subscriber unit converts the information to a form suitable for display on a television receiver. Alternatively or additionally, each subscriber unit converts the information to a form suitable for hard copy output.

Preferably, each subscriber unit stores information received via the telephone link.

BRIEF DESCRIPTION OF THE DRAWINGS

The present invention will be understood and appreciated more fully from the following detailed description, taken in conjunction with the drawings in which.

DETAILED DESCRIPTION OF PREFERRED EMBODIMENTS

Figure 1:
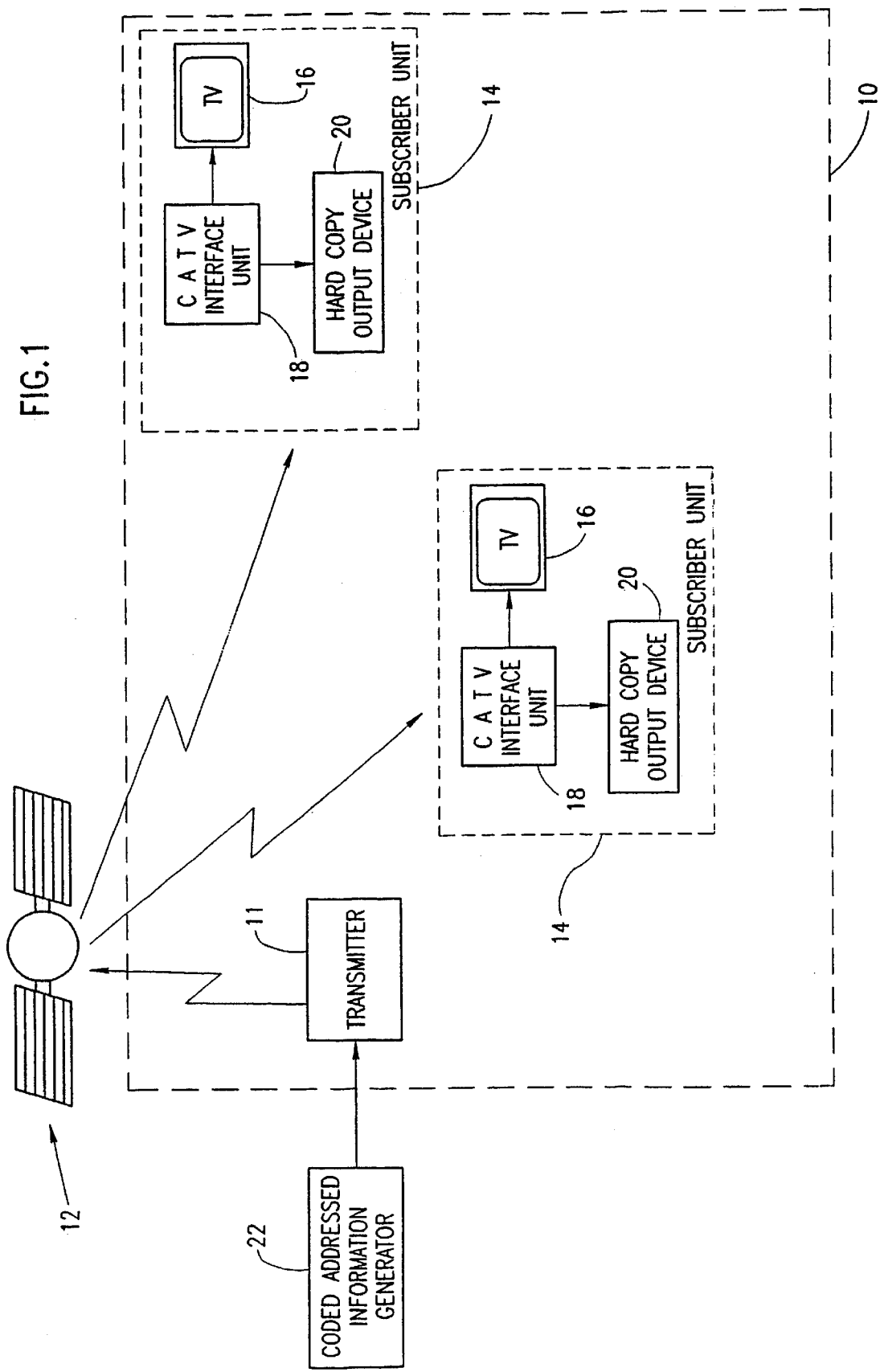
FIG. 1 is a generalized block diagram illustration of a CATV system constructed and operative in accordance with a preferred embodiment of the present invention.

Reference is now made to FIG. 1, which is a generalized block diagram illustration of a CATV system constructed and operative in accordance with a preferred embodiment of the present invention.

The CATV system includes or is used with a CATV network 10 which is typically, but not necessarily, a radio frequency (RF) network including a program transmitter 11 coupled through a satellite communication link 12 with a multiplicity of subscriber units 14. Alternatively, communication link 12 may be either a cable or a fiber-optic communication link.

Preferably, each of the multiplicity of subscriber units 14 includes a television 16 and a CATV interface unit 18. In accordance with a preferred embodiment of the invention, each subscriber unit may also include a hard copy output device 20. Preferably, hard copy output device 20 may be any suitable printer, such as a laser printer or thermal printer having graphics capability. The hard copy output device may be integrally formed as part of interface unit 18 or may be a stand-alone device connected thereto by a cable or wireless link.

The CATV interface unit 18 may include a conventional decoder which is commercially available from multiple vendors.

Conventional CATV data such as authorizations, program viewing data, etc. may be communicated to and from subscriber units 14 in a conventional manner. In accordance with a preferred embodiment of the present invention, there is provided a coded addressed information generator 22 for transmitting encrypted information to subscribers via the CATV system.

Coded addressed information generator 22 may comprise a fax generator, E-mail generator, voice mail generator, mail generator, or any other suitable information generator which is capable of providing information suitable for broadcast via the CATV system to subscribers. Generator 22 may include a scanner for inputting written or printed material and may receive information for broadcast directly form a computer or other data source. Generator 22 may comprise a facsimile machine. Generator 22 preferably provides the information in an encrypted form together with an address or addresses which identify one or more subscribers who are the intended recipients of the information.

Additionally in accordance with a preferred embodiment of the invention, the CATV interface unit 18 at each subscriber unit 14 includes an information decoder which is operative to decrypt only that information from generator 22 which is addressed thereto. It is to be noted that the addressing may be individual, i.e. to individual subscribers, or alternatively grouped, i.e. to subscribers fitting certain criteria, such as demographic or geographic criteria.

It is to be appreciated that the system of FIG. 1 may be provided without a hard copy output device 20 or alternatively without the coded addressed information generator 22 and corresponding decoder in the CATV interface unit.

One possible application of the system of FIG. 1 is in the transmission of bank statements or credit card statements. Instead of transmitting such statements by mail, as is common practice, such statements can be transmitted via the CATV systems at off-peak times, each addressed to a given subscriber, and each decrypted by the CATV interface unit 18 of the appropriate subscriber unit 14. The decrypted information may be stored in a suitable memory, which is either part of the subscriber unit 14 or attached thereto, and then viewed at will by the subscriber and/or produced in a hard copy form by means of the hard copy output device 20.

Another possible application of the system of FIG. 1 is in the transmission of "junk mail" such as grocery store advertisements. Instead of transmitting such material by mail or hand delivery, as is common practice, such material can be transmitted via the CATV systems at off-peak times, addressed to subscribers within a given geographical area, who may be further selected by demographic criteria.

In cases where the hard copy output device 20 is not provided, all of the above-mentioned functionalities operate with the exception of the provision of a hard copy output at the subscriber unit.

In cases where the encrypted addressed information generator 22 and corresponding decoder are not provided, but the hard copy output device is provided, the hard copy output device may be used to provide a hard copy output of any information received via the CATV network, using suitable buffers or memories, which may be part of the hard copy output device or separate therefrom. Such a system may be useful for providing permanent copies of freely broadcast material, which may be, for example, program material, educational material or commercial material.

Where a plurality of cable or fiber optics links having different areas of coverage are employed as opposed to a single satellite communication link, it is appreciated that different material or information may be transmitted along each of such links.

The material received via the CATV system is decrypted by the CATV interface unit 18 of the subscriber units 14 to which it is addressed. The decrypted material may be stored in a suitable memory, either in the subscriber unit 14 or attached thereto, and then viewed at will by the subscriber and/or produced in a hard copy form by means of the hard copy output device 20.

Figure 2:
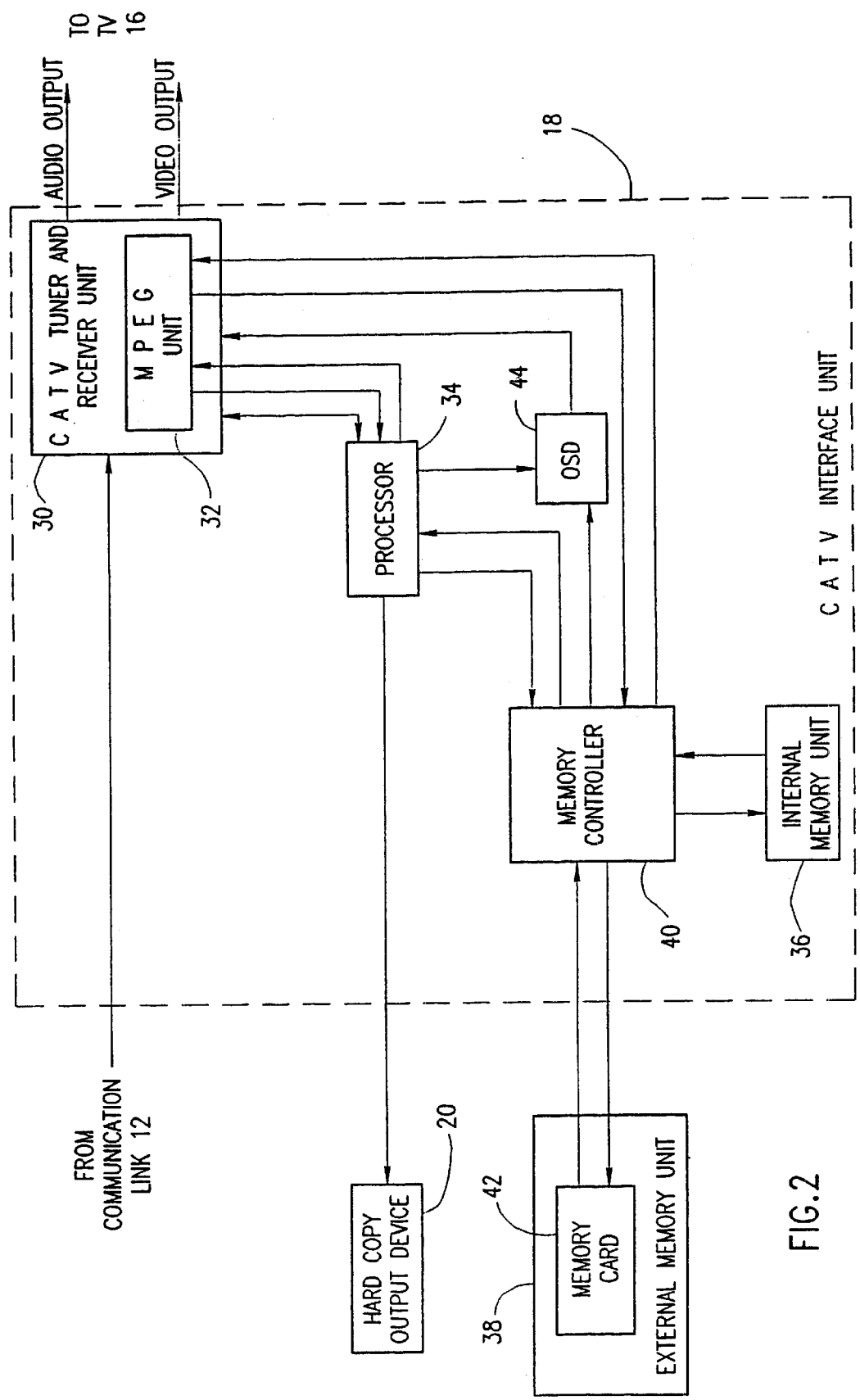
FIG. 2 is a generalized block diagram illustration of part of a subscriber unit constructed and operative in accordance with a preferred embodiment of the present invention.

Reference is now made to FIG. 2 which is a generalized block diagram illustration of CATV interface unit 18 which forms part of subscriber unit 14.

CATV interface unit 18 receives information, such as facsimile, electronic mail, voice mail and mail via communication link 12. This information is received by a CATV tuner and receiver unit 30 preferably including a compression/decompression unit 32, such as an MPEG unit. The information is transmitted directly or via unit 32 to a processor 34.

Processor 34 provides fax data, E-mail, voice-mail and mail data to either of an internal memory unit 36 or external memory unit 38 via a memory controller 40. Preferably, external memory unit 38 includes a memory card 42 and a memory card reader.

In many cases the incoming information arrives in compressed form. If the incoming information is not compressed it may be necessary to compress it before storage in the memory. In that case the compression/decompression unit 32 which is used for regular CATV digital video and audio compression/decompression may be used to provide the fax, E-mail, voice-mail and mail information to either of internal memory unit 36 or external memory unit 38 under the control of processor 34.

Stored faxes, E-mail, voice-mail and mail data are provided by either of the memories 36 and 38 to processor 34 via memory controller 40 and, in the case that the data was previously compressed by compression/decompression unit 32, via unit 32. The stored data may be then provided to an on-screen-display (OSD) unit 44. OSD unit 44 prepares the fax data, the E-mail data, the voice-mail data and the mail data in a format suitable for reception by a TV receiver and provides it to CATV tuner and receiver unit 30. In a preferred embodiment of the invention OSD unit 44 may be part of the CATV tuner and receiver unit 30. Alternatively, OSD unit 44 may be part of processor 34. In yet another preferred embodiment of the invention, processor 34 may be also part of the CATV tuner and receiver unit 30.

CATV tuner and receiver unit 30 also receives encrypted video and audio program transmissions from satellite or cable link 12 and provides decrypted video and audio data to TV 16 (FIG. 1). CATV tuner and receiver unit 30 may be operable upon receipt of suitable authorization from a headend (not shown).

Upon tuning the television receiver to an information display channel, such as a fax display channel or upon selection of a non-CATV data display option on a CATV remote control unit when the television receiver is tuned to any channel, CATV tuner and receiver unit 30 displays on the television receiver images of stored information, such as faxes, together with audio from communication link 12 or voice-mail, which accompanies the received information. The audio from link 12 may alternatively be any suitable background music.

At any time, prior to, during or after display of the received information on the TV, a hard copy thereof may be provided by hard copy output device 20.

Figure 3A:
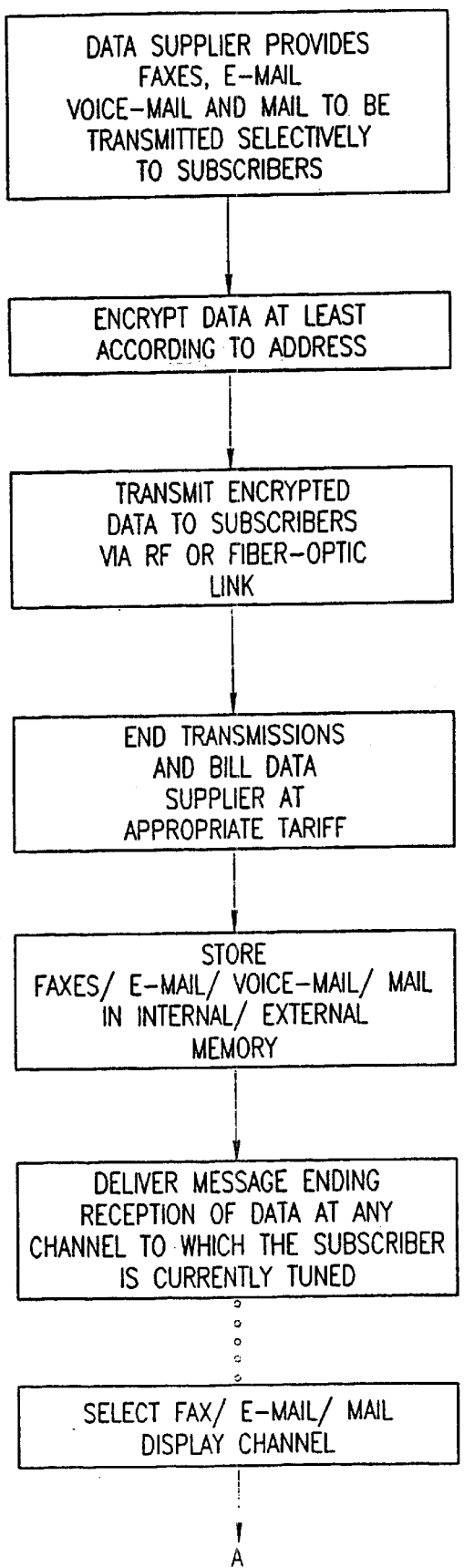
FIGS. 3A and 3B together provide a flow-chart description of the functionality of the apparatus of FIG. 2.
Figure 3B:
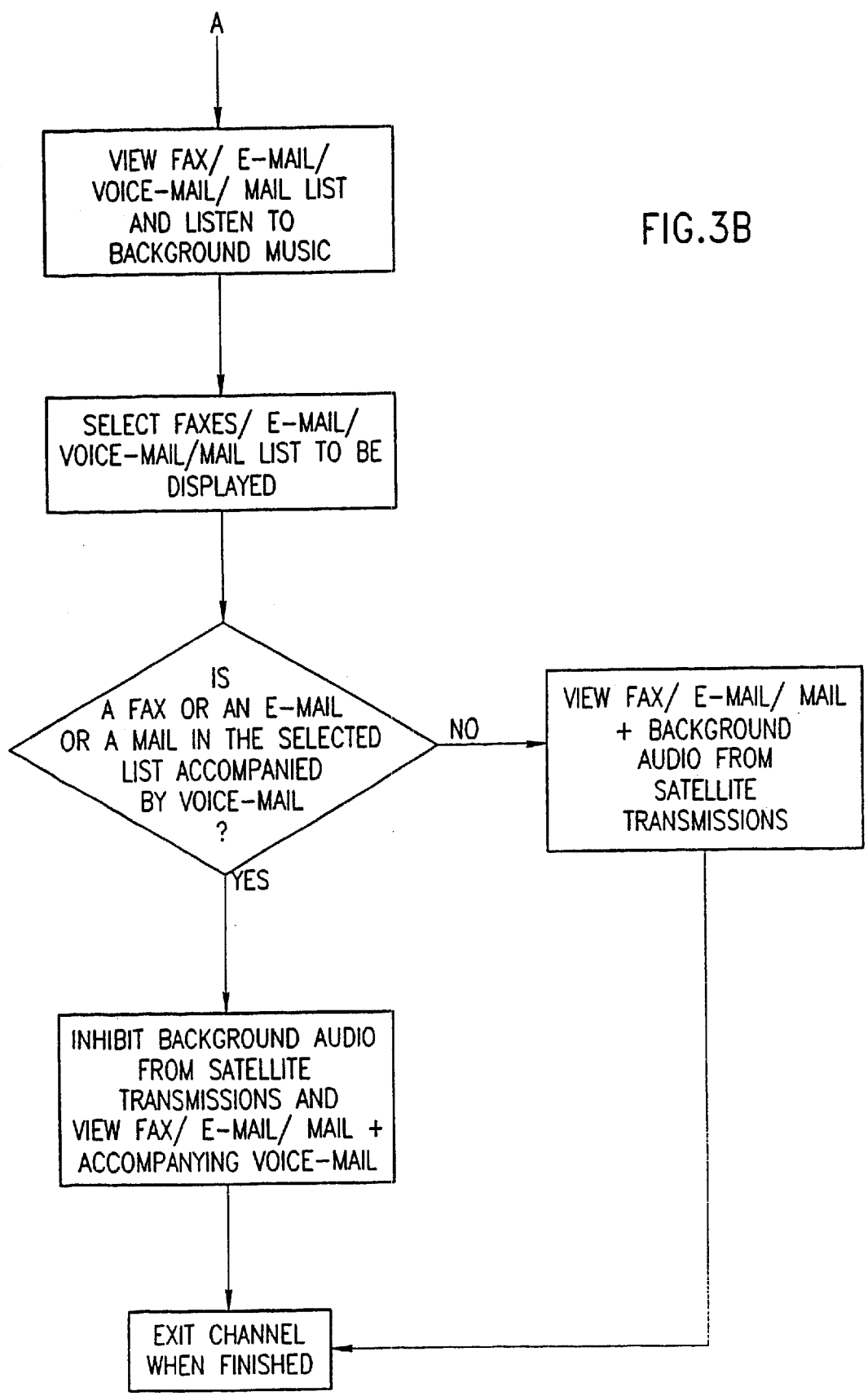

Reference is now made to FIGS. 3A and 3B which together provide a flow-chart description of the functionality of the apparatus of FIG. 2.

A data supplier provides faxes, E-mail, voice-mail and mail data to be transmitted selectively to subscribers by means of transmitter 11 (FIG. 1). The data is preferably encrypted at the transmitter such that only the addressee is able to decrypt the data. Alternatively, additional, more robust encryption techniques may be employed.

The encrypted data is transmitted to subscribers via the RF or fiber-optic communication link 12 (FIG. 1). If the data from the data supplier includes only visual data, accompanying audio programs or background music may be added at the transmitter. Alternatively, the visual data may be transmitted without accompanying audio. In a preferred embodiment of the invention the accompanying audio is scrambled.

If the data from data supplier includes visual data accompanied by voice-mail data then the visual data is transmitted with the accompanying voice-mail data.

When the data transmissions are terminated the data suppliers are billed at the appropriate tariff. Alternatively, under certain circumstances, the subscriber could be billed for the data transmission.

Usually, fax, E-mail, voice-mail and mail data is sent by service suppliers to promote their business. Such data is generally sent late at night when the usual CATV programming is terminated and transmission tariffs are low. However, data may also be transmitted during the day at higher tariffs.

After the data transmission is successfully completed the facsimile, E-mail and voice-mail data is stored in either of internal memory 36 or external memory 38 of CATV interface unit 18 (FIG. 2). The subscriber then receives a message confirming the reception of new data on a television receiver at any channel to which he is currently tuned.

Upon selecting a fax/E-mail CATV display channel on the television receiver the subscriber may view a fax/E-mail/mail/voice-mail list and listen to background music from CATV or cable transmissions. The subscriber is then able to select the fax/E-mail/mail/voice-mail data and messages he prefers to see by using a CATV remote control unit or the keyboard on the CATV interface unit 18.

If a fax, an E-mail or mail message is accompanied by a voice-mail message the subscriber is able to both view the fax, E-mail or mail and hear the voice-mail message at the same time.

If, however, the fax, E-mail or mail is delivered without any accompanying voice message, the subscriber may be able to hear background music from the CATV satellite or cable transmissions.

Figure 4:
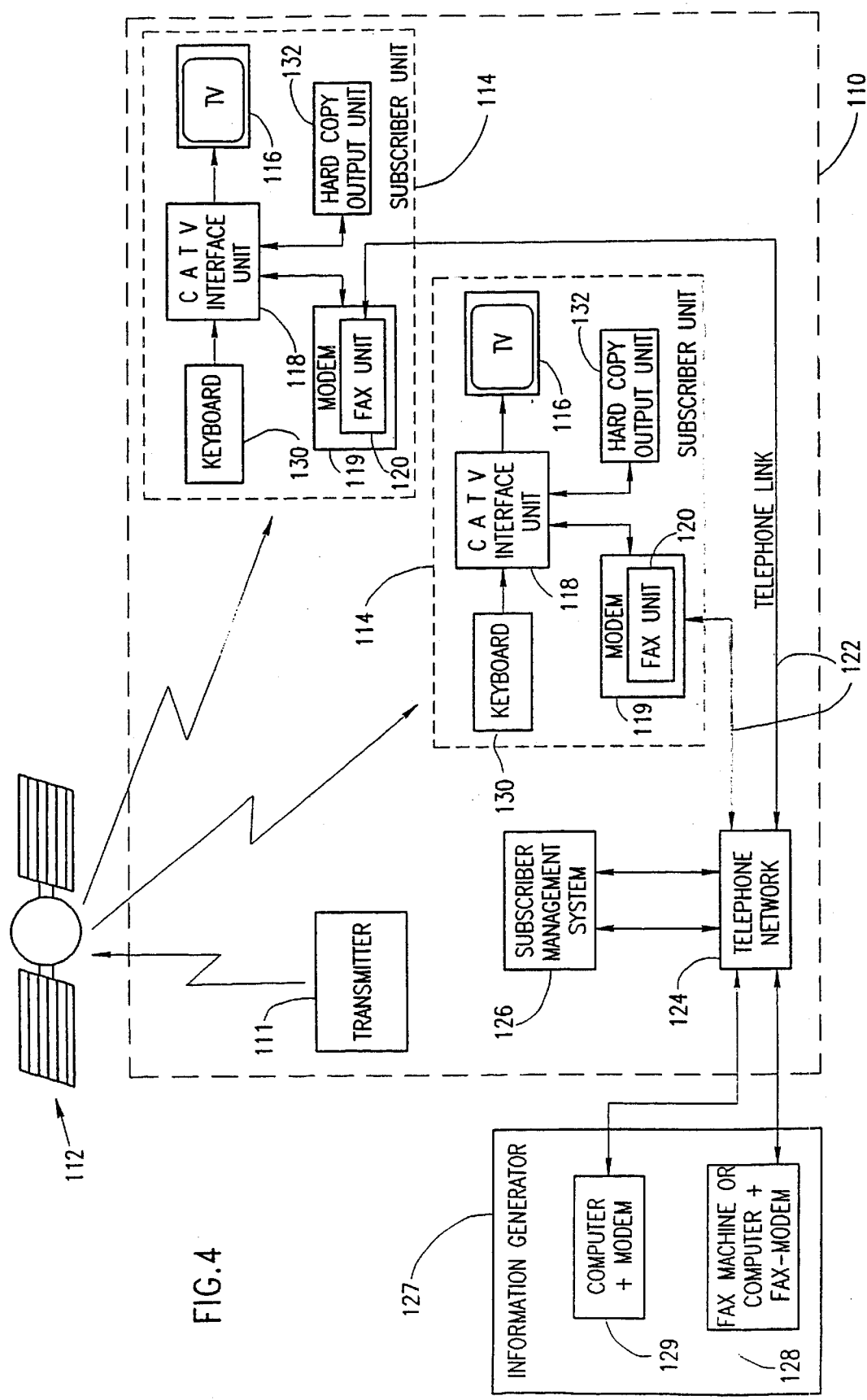
FIG. 4 is a generalized block diagram illustration of a CATV system constructed and operative in accordance with another preferred embodiment of the present invention.

Reference is now made to FIG. 4, which is a generalized block diagram illustration of a CATV system constructed and operative in accordance with another preferred embodiment of the present invention.

The CATV system includes or is used with a CATV network 110 which is typically a combination telephone—radio frequency (RF) network including a program transmitter 111 coupled through a satellite communication link 112 with a multiplicity of subscriber units 114. Alternatively, communication link 112 may be either a cable or a fiber-optic communication link.

Preferably, each of the multiplicity of subscriber units includes a television 116, a CATV interface unit 118 preferably having associated therewith a telephonic modem 119 and a receive-transmit fax unit 120. Preferably, fax unit 120 may be part of telephonic modem 119. In that case the telephonic modem and the fax unit are usually incorporated in a single electronic board which is called a "Fax-modem". Alternatively this need not be the case, and the fax unit may be a separate unit.

The CATV interface unit 118 may include a conventional decoder which is commercially available from multiple vendors. A fax-modem board may replace the standard modem board in the decoder and provide fax services as well as standard telephonic communications, E-mail, voice-mail and mail services. Fax-modem boards are commercially available from several vendors, such as the Everfax 24/96 2400 bps internal modem card w/9600 bps fax by EVEREX.

CATV interface units 118 may be connected, via the fax units 120 and via telephone links 122, to a standard telephone network 124 for voice, data and fax communications.

Conventional CATV data such as authorizations and program viewing data is communicated to and from a subscriber management system 126. Facsimile, E-mail, voice-mail and mail data may be provided to the subscriber units 114 via the CATV network from an information generator 127, such as a standard fax machine 128 or a computer and associated modem 129.

In a preferred embodiment of the invention the CATV interface unit 118 may be also associated with a keyboard 130 to produce faxes to be sent to either of fax machines or internal fax-modem cards via the CATV network.

Figure 5:
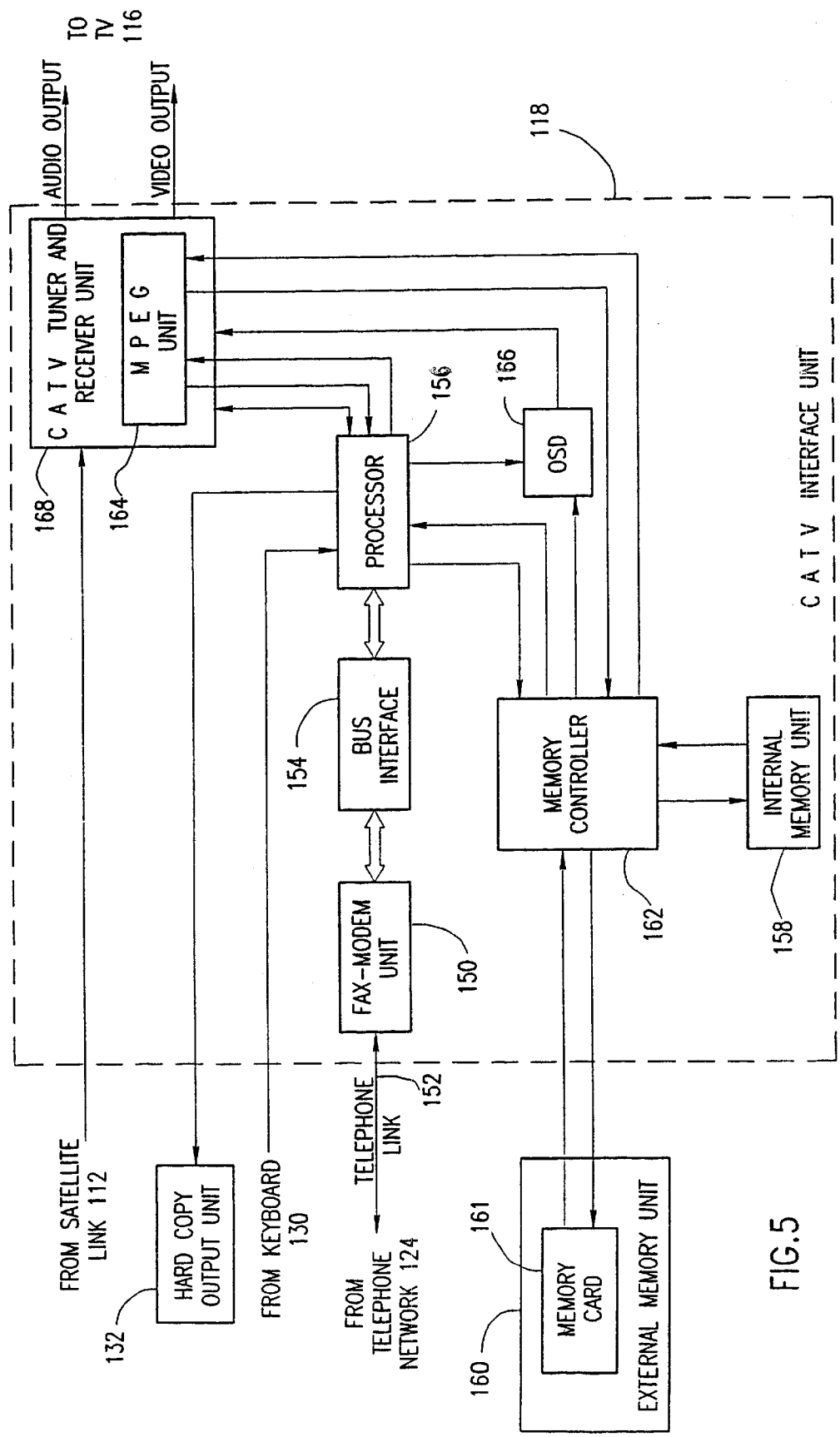
FIG. 5 is a generalized block diagram illustration of part of a subscriber unit constructed and operative in accordance with a preferred embodiment of the present invention.

Reference is now made to FIG. 5 which is a generalized block diagram illustration of CATV interface unit 118 which forms part of subscriber unit 114.

CATV interface unit 118 receives facsimile data, E-mail data, voice-mail data and mail data as well as communication management data from telephone network 124 (FIG. 4), forming of CATV network 110, via a receive-transmit fax-modem unit 150 and a standard telephone link 152. Fax-modem unit 150 provides data to a processor 156 via a communication BUS interface 154.

Processor 156 provides fax data, E-mail data, voice-mail data and mail data to either of an internal memory unit 158 or an external memory module 160 via a memory controller 162. Preferably, external memory unit 160 includes a memory card 161 and a memory card reader.

In a preferred embodiment of the invention processor 156 also receives data input by a subscriber via keyboard 130 (FIG. 4) and prepares it in a suitable format for transmission as fax, E-mail or mail data via telephone link 152. Processor 156 may also provide fax data, E-mail data, voice-mail data and mail data to hard copy output unit 132 for printout.

In many cases the fax-modem card already includes a compression/decompression standard unit for facsimile transmission and reception. If the fax data is not compressed at the fax-modem it may be necessary to compress it before storage in the memory. In that case the compression/decompression unit which is used for conventional CATV digital video and audio transmissions may be used, so that processor 156 provides the fax, E-mail, voice-mail and mail data to either of internal memory unit 158 or external memory module 160 via compression/decompression unit 164, preferably in the MPEG format, and via memory controller 162.

Stored faxes, E-mail, voice-mail and mail data are provided by either of the memories 158 or 160 to processor 156 via memory controller 162 and, in the case that the data was previously compressed by compression/decompression unit 164, via unit 164. The stored data is then provided to an on-screen-display (OSD) unit 166. OSD unit 166 prepares the fax data, the E-mail data, the voice-mail data and the mail data in a format suitable for reception by a TV receiver and provides it to CATV tuner and receiver unit 168. In a preferred embodiment of the invention OSD unit 166 may be part of the CATV tuner and receiver unit 168.

CATV tuner and receiver unit 168 also receives encrypted video and audio program transmissions from communication link 112 and provides decrypted video and audio data to TV 116. CATV tuner and receiver unit 168 is operable upon authorizations received from subscriber management system 126.

Upon tuning the television receiver to an information display channel, such as a fax display channel or upon selection of a non-CATV data display option on a CATV remote control unit when the television receiver is tuned to any channel, CATV tuner and receiver unit 168 displays on the television receiver images of stored information, such as faxes, together with audio from communication link 112 or voice-mail, which accompanies the received information. The audio from link 112 may alternatively be any suitable background music.

At any time, prior to, during or after display of the information on the TV, a hard copy thereof may be provided by hard copy output device 132.

Figure 6A:
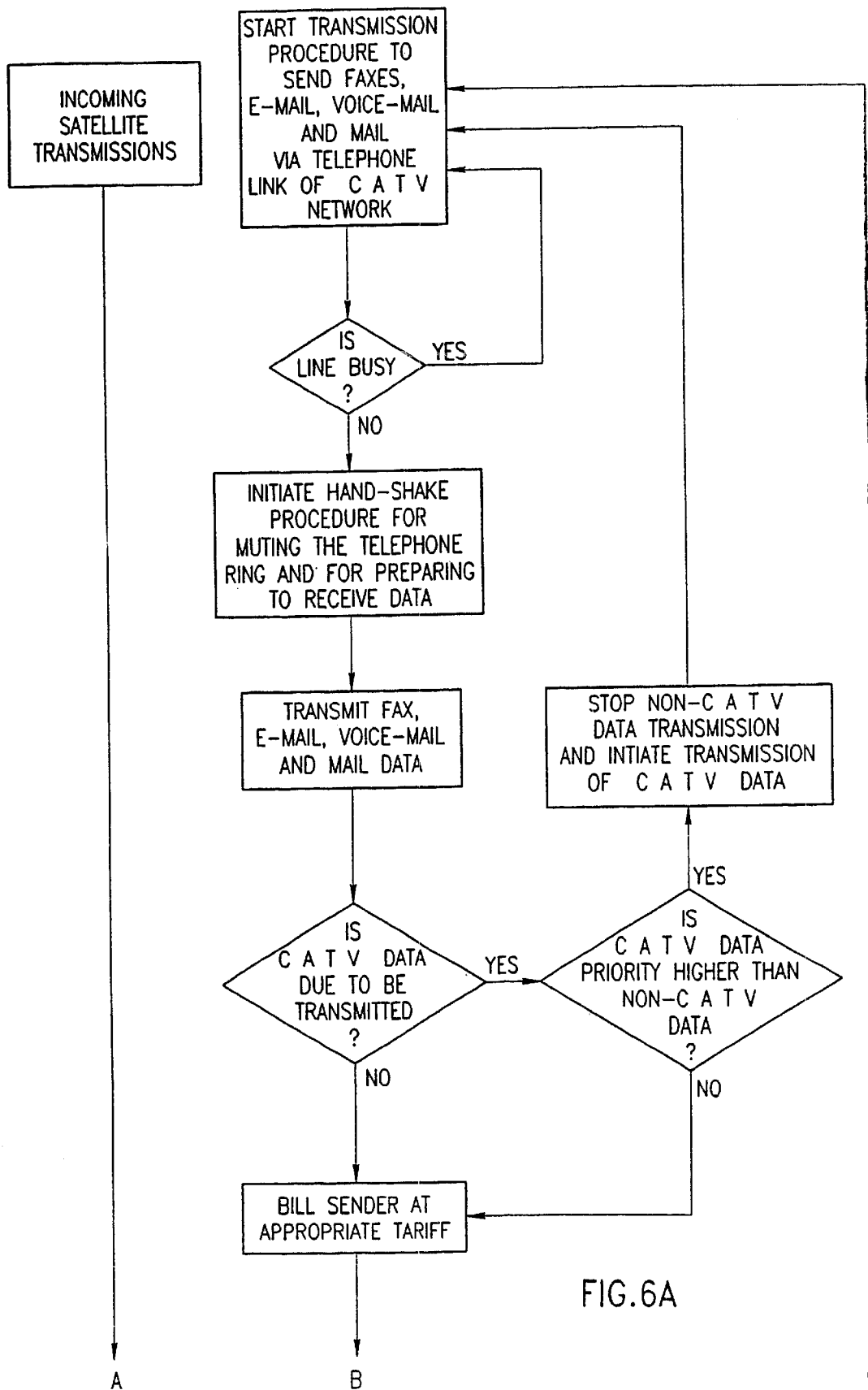
FIGS. 6A, 6B and 6C together provide a flow-chart description of the functionality of the apparatus of FIG. 5.
Figure 6B:
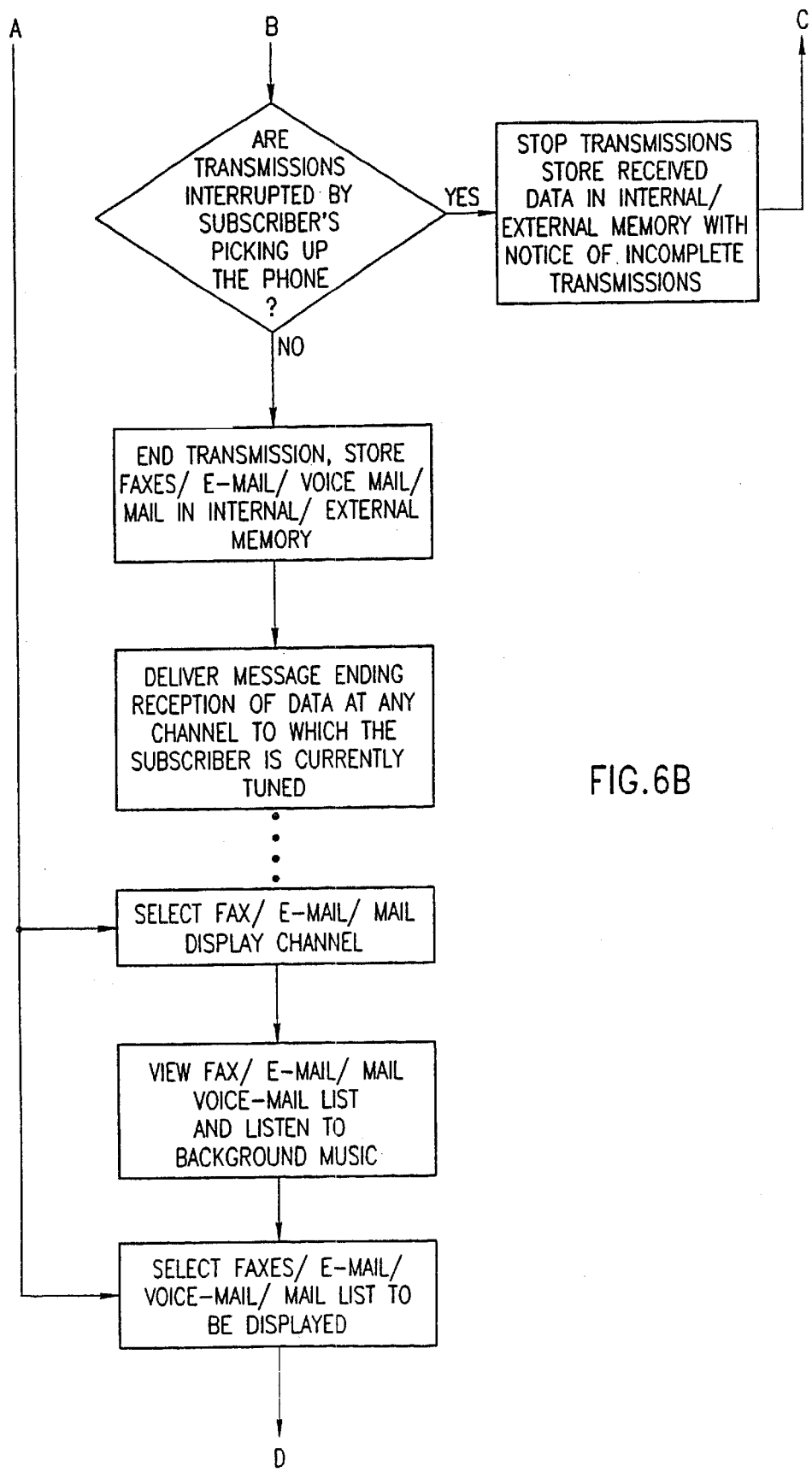
Figure 6C:
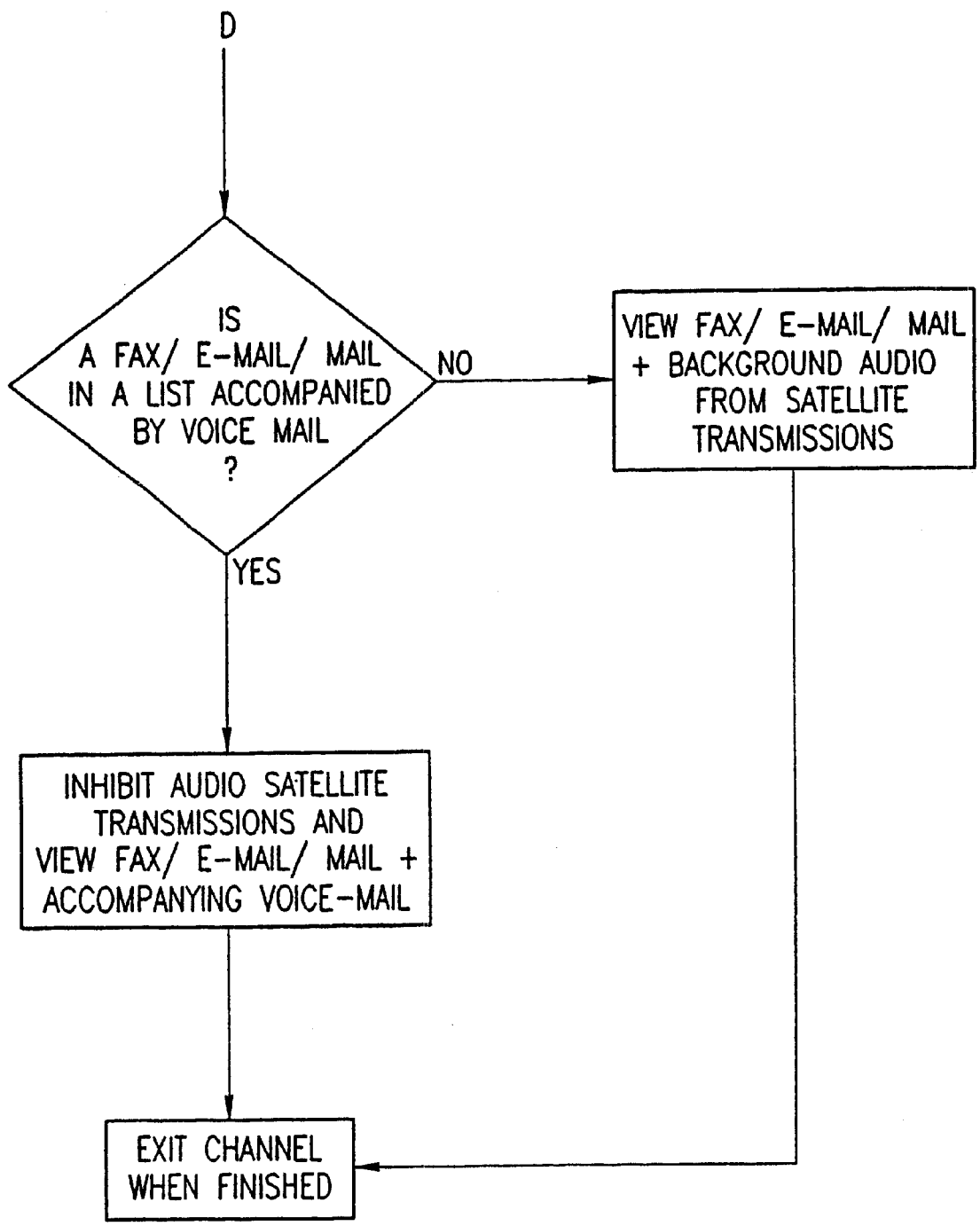

Reference is now made to FIGS. 6A, 6B and 6C which together provide a flow-chart description of the functionality of the apparatus of FIG. 5.

Faxes, E-mail, voice-mail and mail data are sent via the CATV network by a data supplier from one end of the telephonic communications link to a subscriber at the other end. At the same time conventional CATV programs are received by the subscriber. If the telephone line at the subscriber is busy at that time, the data is not sent. If however the line is free, a hand-shake procedure for muting the telephone ring is initiated and the data from the sender is transmitted to the subscriber. The sender is then billed at the appropriate tariff. Alternatively, in certain cases, the subscriber may be billed.

If the communication of faxes, E-mail, voice-mail and mail data occurs at the same time as the communication of CATV management data or subscriber's program viewing data, the CATV data receives priority over the other non-CATV data. However, on special occasions, if the non-CATV data is important it may be necessary to complete transmissions without interference. For such cases special priority codes are employed which are used with conventional telephonic data communications.

Generally, CATV data has higher priority than regular non-CATV data, and special non-CATV data has higher priority than CATV data. Therefore, the tariffs for special non-CATV data transmission are higher than the tariffs for regular non-CATV data transmission. Preferably, the priority codes are a digit having the value of 1—for regular non-CATV data transmissions, 2—for CATV data transmissions and 3—for special non-CATV data transmissions.

Usually, faxes, E-mail, voice-mail and mail data are sent by service providers to promote their business. Such data is generally sent late at night when the telephone lines are not likely to be busy and the tariffs are low. If, however, a service provider prefers to send data during the day he is billed at higher tariffs.

If the subscriber interrupts transmissions by picking up the telephone, the data transmissions are interrupted and the portion of the data which has been already transmitted is stored in either of internal memory module 158 or external memory module 160 (FIG. 5) together with a notice of incomplete transmission. The sender also receives such a message and consequently he will try to send the data later. This feature is similar to the fax transmission procedure between two fax-modems or fax machines.

After the data transmission is successfully completed the facsimile, E-mail, voice-mail and mail data is stored in either of internal memory 158 or external memory 160 (FIG. 5). The subscriber then receives a message confirming the reception of new data on a television receiver at any channel to which he is currently tuned.

Upon selecting a fax/E-mail CATV display channel the subscriber may view a fax/E-mail/voice-mail/mail list and listen to background music from CATV satellite or cable transmissions. The subscriber is then able to select from a list the faxes/E-mail/voice-mail/mail data and messages he prefers to see by using a CATV remote control unit or the keyboard on the CATV interface unit 118.

If a fax, an E-mail or an mail message is accompanied by a voice-mail message the subscriber is able to both view the fax and hear the voice-mail message at the same time. If, however, the fax or E-mail or mail is delivered without any voice message accompanying it, the subscriber may be able to hear background music from the CATV satellite or cable transmissions.

It will be appreciated by persons skilled in the art that the present invention is not limited by what has been particularly shown and described hereinabove. Rather the scope of the present invention is defined only by the claims which follow.

What is claimed is:

1. A CATV method for use with a CATV network and a multiplicity of subscriber units, the method comprising:
   determining a collision between non-real-time individually addressed information transmitted to a subscriber unit and at least one of the following types of non-real-time non-video data:
      CATV management data transmitted to the subscriber unit; and
      subscriber's program viewing data transmitted to the subscriber unit,
   wherein the individually addressed information does not comprise either of the following:
      a program ordered by a user of the subscriber unit; and
      messages and billing data related to programming; and
   assigning one of the following in accordance with at least one predetermined criterion:
      a higher priority to the CATV management data and the subscriber's program viewing data than to the individually addressed information; and
      a lower priority to the CATV management data and the subscriber's program viewing data than to the individually addressed information.

2. The method according to claim 1 and wherein said individually addressed information comprises electronic-mail information.

3. The method according to claim 1 and wherein said individually addressed information comprises voice-mail information.

4. The method according to claim 1 and wherein said individually addressed information comprises facsimile information.

5. The method according to claim 1 and wherein said individually addressed information comprises mail information.

6. A headend in a CATV network, the headend comprising:

determining circuitry operative to determine a collision between non-real-time individually addressed information transmitted to a subscriber unit and at least one of the following types of non-real-time non-video data: CATV management data transmitted to the subscriber unit; and subscriber's program viewing data transmitted to the subscriber unit, wherein the individually addressed information does not comprise either of the following:
      a program ordered by a user of the subscriber unit; and messages and billing data related to programming; and
   a processor operatively associated with the determining circuitry and operative to assign one of the following in accordance with at least one predetermined criterion: a higher priority to the CATV management data and the subscriber's program viewing data than to the individually addressed information; and a lower priority to the CATV management data and the subscriber's program viewing data than to the individually addressed information.

7. The headend according to claim 6 and wherein said individually addressed information comprises electronic-mail information.

8. The headend according to claim 6 and wherein said individually addressed information comprises voice-mail information.

9. The headend according to claim 6 and wherein said individually addressed information comprises facsimile information.

10. The headend according to claim 6 and wherein said individually addressed information comprises mail information.

11. A headend in a CATV network, the headend comprising:

determining means for determining a collision between non-real-time individually addressed information transmitted to a subscriber unit and at least one of the following types of non-real-time non-video data: CATV management data transmitted to the subscriber unit; and subscriber's program viewing data transmitted to the subscriber unit, wherein the individually addressed information does not comprise either of the following:
       a program ordered by a user of the subscriber unit; and messages and billing data related to programming; and
    processing means for assigning one of the following in accordance with at least one predetermined criterion: a higher priority to the CATV management data and the subscriber's program viewing data than to the individually addressed information; and a lower priority to the CATV management data and the subscriber's program viewing data than to the individually addressed information.

12. The headend according to claim 11 and wherein said individually addressed information comprises electronic-mail information.

13. The headend according to claim 11 and wherein said individually addressed information comprises voice-mail information.

14. The headend according to claim 11 and wherein said individually addressed information comprises facsimile information.

15. The headend according to claim 11 and wherein said individually addressed information comprises mail information.

* * * * *